W. C. MASON.
TRACTION PLATE.
APPLICATION FILED APR. 28, 1920.
1,380,574.
Patented June 7, 1921.
2 SHEETS—SHEET 1.
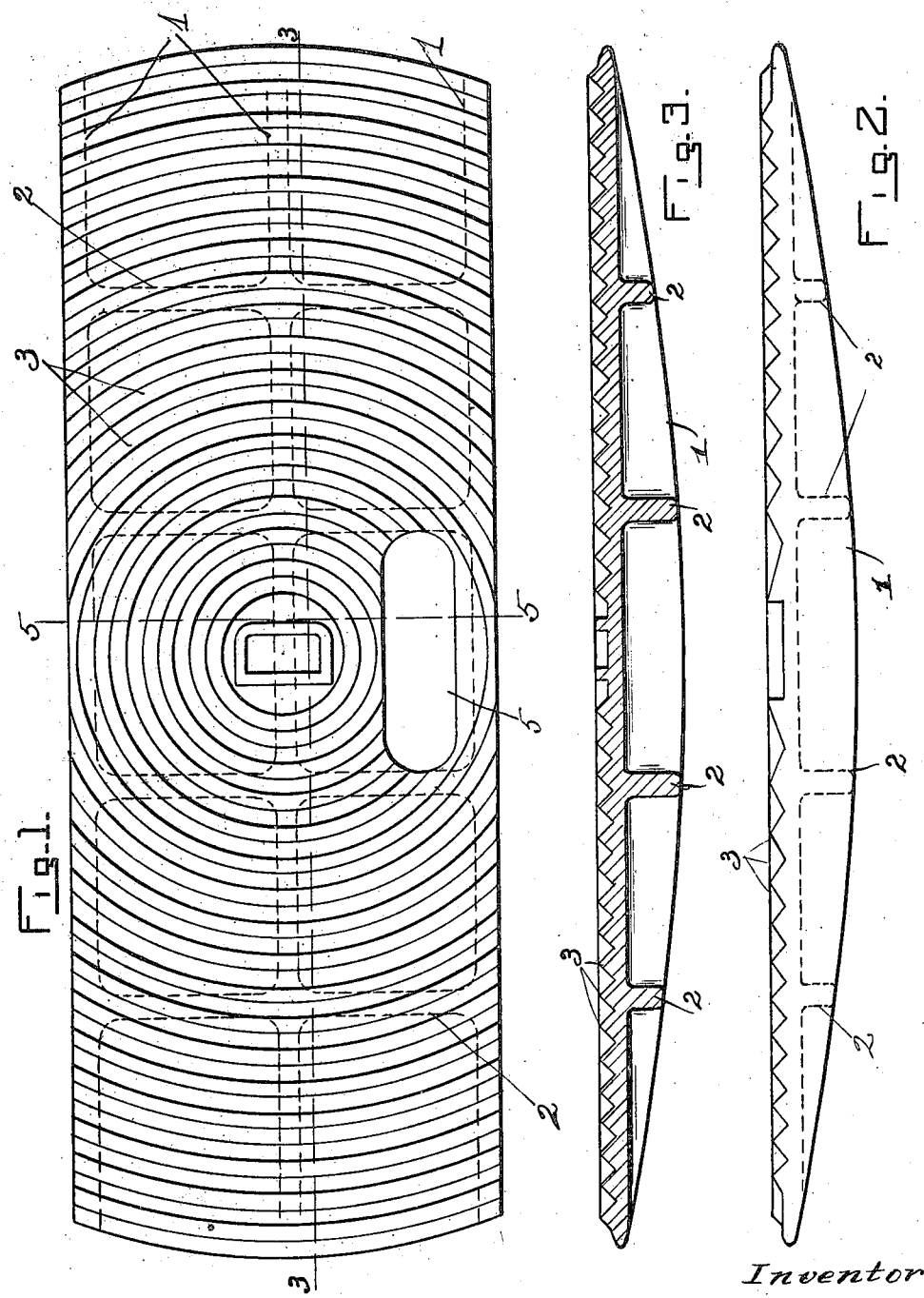
Inventor
William C. Mason
By Frank C. Curtis
Attorney

W. C. MASON.
TRACTION PLATE.
APPLICATION FILED APR. 28, 1920.

1,380,574.

Patented June 7, 1921.
2 SHEETS—SHEET 2.

Inventor
William C. Mason
By Frank C. Curtis
Attorney

UNITED STATES PATENT OFFICE.

WILLIAM C. MASON, OF ALBANY, NEW YORK.

TRACTION-PLATE.

1,380,574.   Specification of Letters Patent.   Patented June 7, 1921.

Application filed April 28, 1920. Serial No. 377,381.

*To all whom it may concern:*

Be it known that I, WILLIAM C. MASON, a citizen of the United States of America, residing at Albany, in the county of Albany and State of New York, have invented new and useful Improvements in Traction-Plates, of which the following is a specification.

Reference may be had to the accompanying drawings and the reference characters marked thereon, which form a part of this specification. Similar characters refer to similar parts in the several figures therein.

This invention relates to traction-plates adapted to form a temporary tread for truck-wheels when the truck becomes stalled in mud, snow or the like.

The principal object of the invention is to provide in simple form a traction-plate adapted to form a substantial tread for the wheel and of sufficient strength and rigidity to bridge over hollow places in the path of the wheel.

Other objects will appear in connection with the following description.

Figure 1 of the drawings is a top plan view of a traction plate embodying my invention.

Fig. 2 is a view in side elevation of the same.

Fig. 3 is a longitudinal vertical section of the same taken on the broken line 3—3 in Fig. 1.

Fig. 6 is a top plan view of a broken-away portion of the plate showing a modified form of tread-surface.

Figure 8:
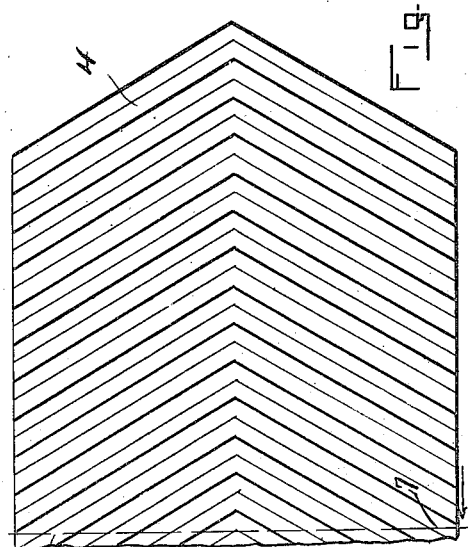
Figure 4:
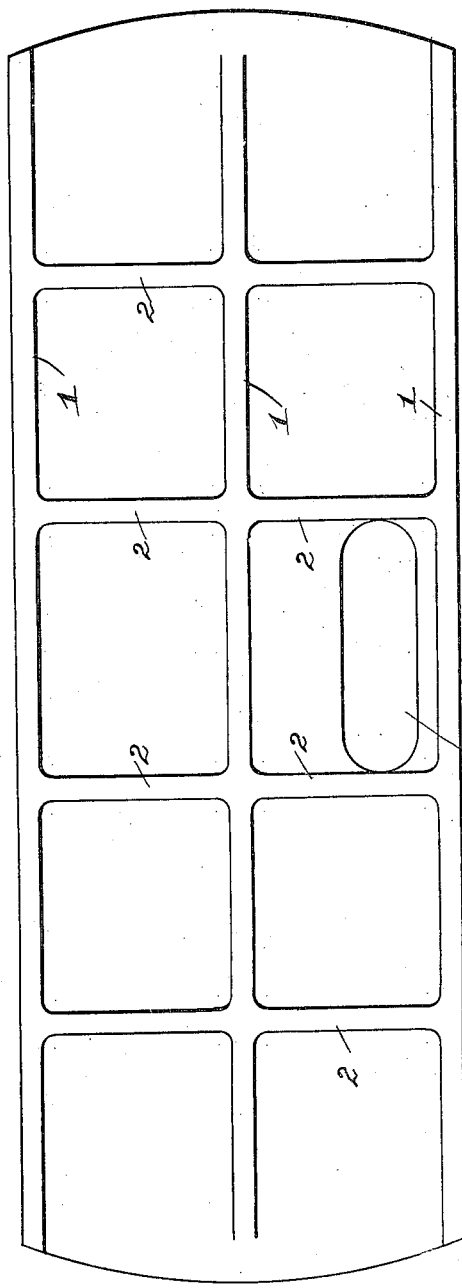
Fig. 4 is a bottom plan view of the same.

Referring to the drawings wherein the invention is shown in preferred form, the traction-plate comprises an elongated body formed on one side with a tread-surface and on the opposite side with longitudinal flanges, 1, one along the longitudinal middle of the plate and one along each side edge of the plate, with transverse flanges, 2, extending from the middle longitudinal flange to the respective side flanges at suitable intervals.

The longitudinal flanges, 1, gradually diminish in height toward the respective ends of the plate giving to the plate a general truss-form, and substantially uniform strength to resist breaking strain throughout the length of the plate.

The transverse flanges, 2, not only strengthen the plate but form tread-projections adapted to become embedded in the surface upon which the traction plate rests.

The upper or tread surface of the plate is preferably formed with transverse ribs, 3, adapted to be more or less embedded in a rubber tire passing over the plate, and prevent the wheel from slipping upon the tread-surface of the plate.

In Fig. 1 I have shown these ribs in the form of arcs of concentric circles whereby the ribs symmetrically diverge from the longitudinal middle line toward the transverse middle line of the plate.

With the ribs thus formed, when either end of the plate is presented to a truck-wheel and engaged thereby, rotation of the wheel in a direction to draw the plate beneath the wheel tends to center the plate with respect to the wheel, and to cause the plate to be alined with the wheel along the path to be traversed by the wheel.

Figure 7:
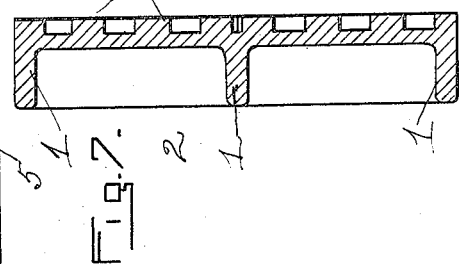
Fig. 7 is a vertical cross-section taken on the broken line 7—7 in Fig. 6.
Figure 5:
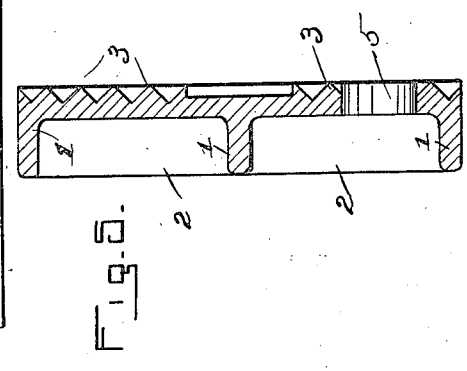
Fig. 5 is a vertical cross section of the same taken on the broken line 5—5 in Fig. 1.

The ribs may be of any desired cross-sectional form. In Figs. 2 and 3, the ribs are shown of saw-toothed form. In Fig. 6 the ribs, 4, are shown symmetrically divergent in straight lines from the longitudinal middle line toward the transverse middle line of the plate, these ribs being square in cross section as shown in Fig. 7.

The plate is preferably provided with a handhole, 5, adjacent to one of the longitudinal side flanges.

My traction plate may be made of any desired material having sufficient strength for the intended purpose, and I prefer to make the same of malleable cast-iron.

The plate so made has great strength, but is comparatively light in weight.

When a truck-wheel or other vehicle wheel becomes stalled in mud or snow, the plate can be quickly placed in the path of the wheel and the end of the plate forced slightly under the wheel, thus providing in the path of the wheel a traction-surface over which the wheel will readily ride.

The plate can also be used for bridging over a gutter or other depression.

By having the ribs, 3 or 4, divergent as shown, they not only tend to center the plate with respect to the wheel, but add substantially to the strength of the plate to resist transverse breaking strain.

By having the plate tapered toward one or both ends with a rocker-surface on the under side of the plate, such as the surface formed by the curved longitudinal ribs, the insertion of the plate beneath a wheel is greatly facilitated, because the tapered end of the plate can be inserted beneath the wheel and the plate can then be rocked by the foot with sufficient force to more or less raise the wheel due to the leverage afforded by the rocker-surface, and by thus rocking the plate, and at the same time pushing it toward the wheel it can be easily inserted into traction-position beneath the wheel.

What I claim as new and desire to secure by Letters Patent is—

1. A traction-plate having on one side a tread-surface, and on the opposite side a rocker-surface tapering toward an end of the plate.

2. A traction-plate having on one side a tread-surface, and on the opposite side longitudinal flanges gradually diminishing in height toward the respective ends of the plate, and forming a rocker-surface on the under side of the plate.

3. A traction-plate having on one side a tread-surface, and on the opposite side longitudinal flanges along its side edges and its longitudinal middle, said flanges gradually diminishing in height toward the respective ends of the plate, and transverse flanges extending from the middle flange to the respective side flanges.

4. A traction-plate having a tread-surface formed with transverse ribs diverging from the longitudinal middle line toward the transverse middle line of the plate.

In testimony whereof, I have hereunto set my hand this 26th day of April, 1920.

WILLIAM C. MASON.